Aug. 16, 1960 R. E. HAGEN ET AL 2,949,530
FLASHLIGHT
Filed March 22, 1957 3 Sheets-Sheet 1
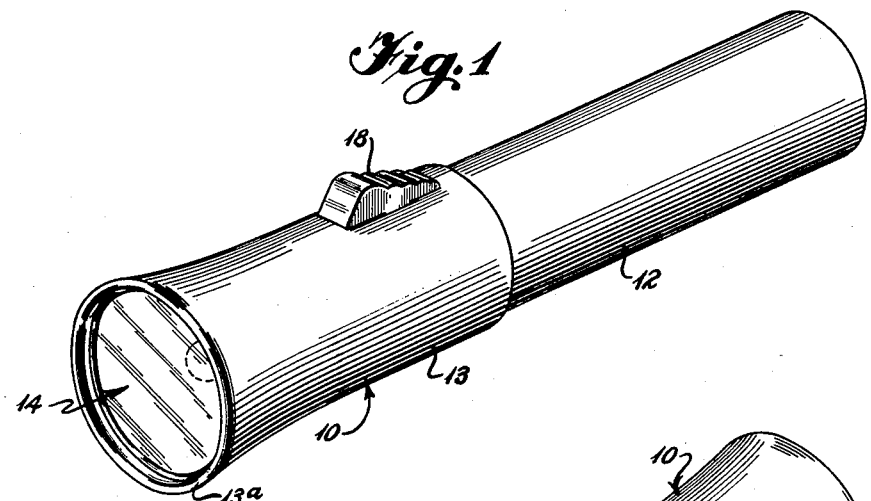
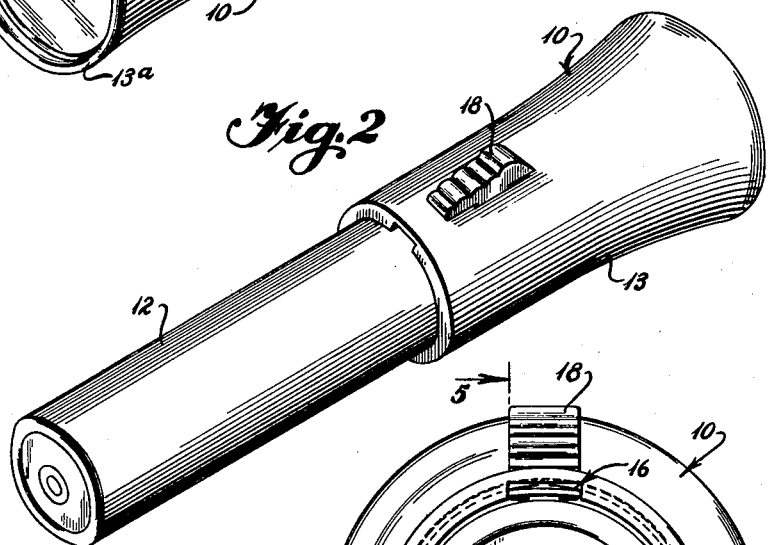
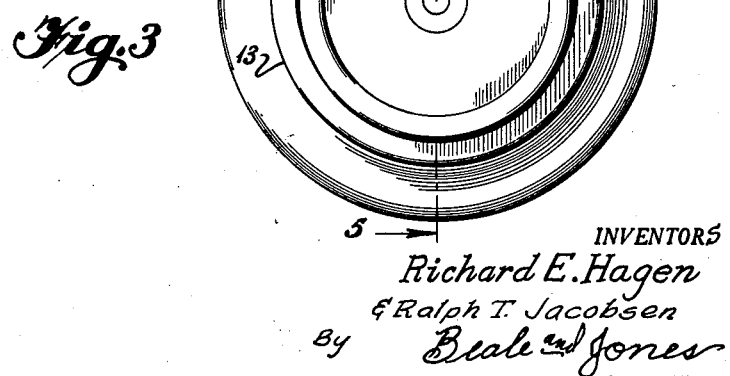
INVENTORS
Richard E. Hagen
& Ralph T. Jacobsen
By Beale and Jones
ATTORNEYS Aug. 16, 1960  R. E. HAGEN ET AL  2,949,530
FLASHLIGHT
Filed March 22, 1957  3 Sheets-Sheet 2
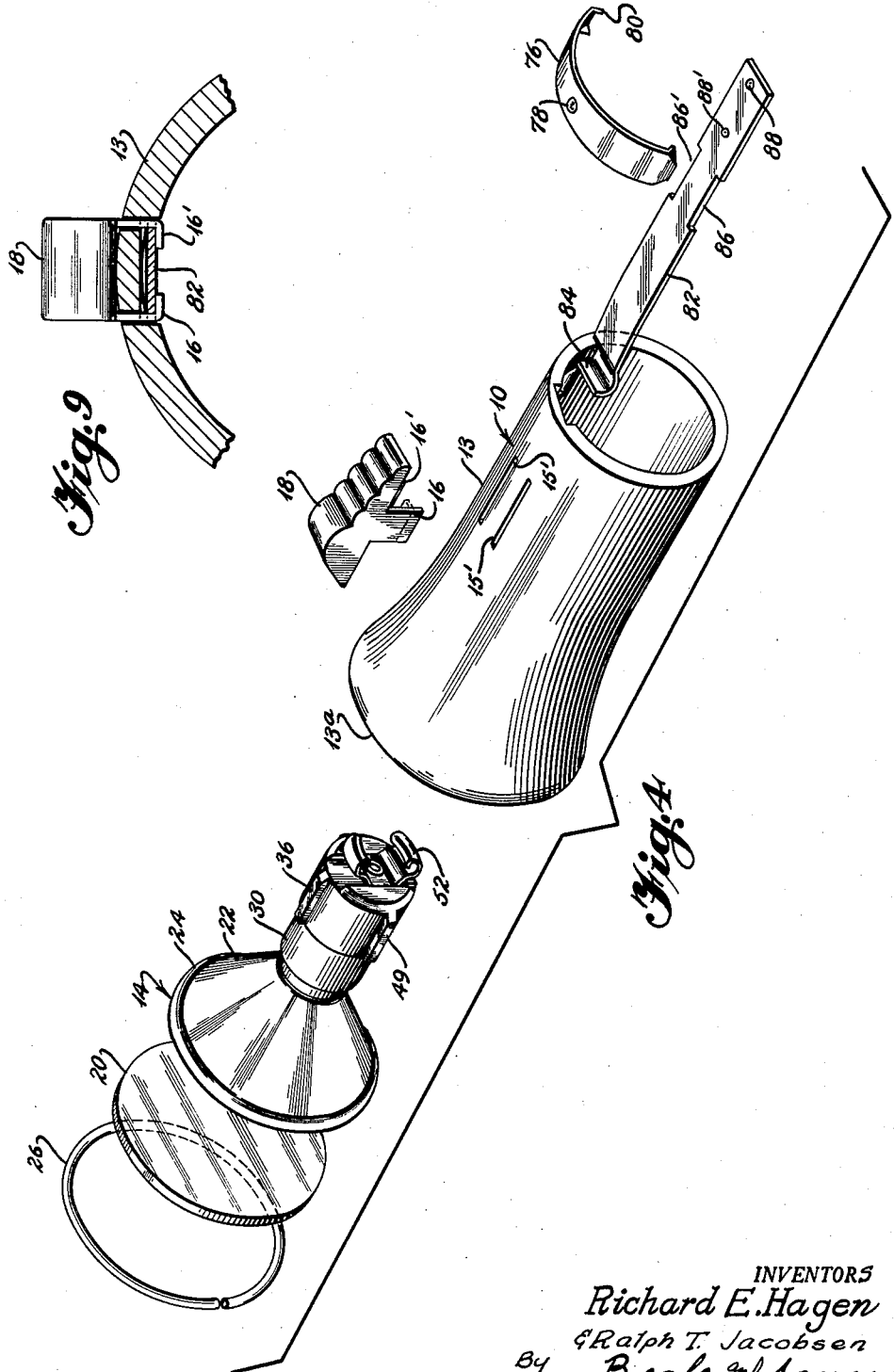
INVENTORS
Richard E. Hagen
& Ralph T. Jacobsen
By Beale and Jones
ATTORNEYS Aug. 16, 1960 R. E. HAGEN ET AL 2,949,530
FLASHLIGHT
Filed March 22, 1957 3 Sheets-Sheet 3
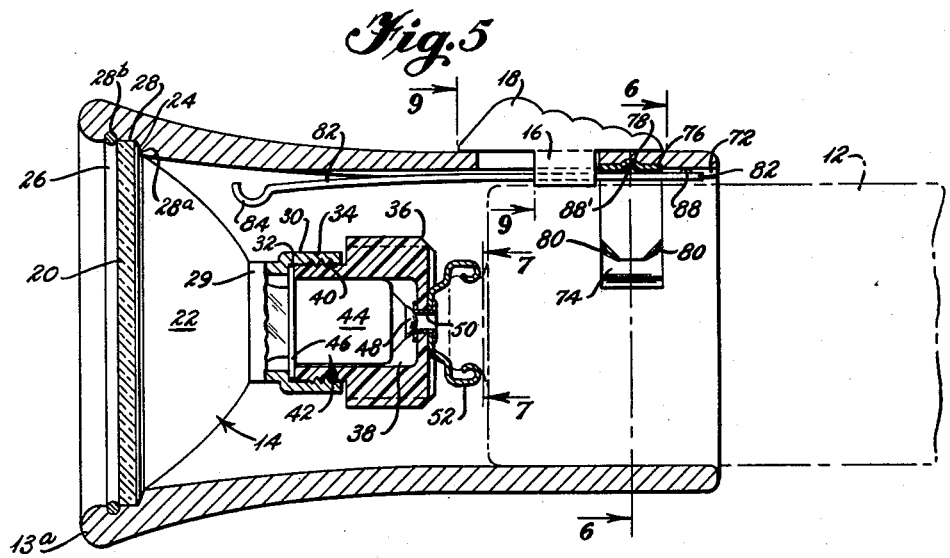
INVENTORS
Richard E. Hagen
& Ralph T. Jacobsen
By Beale and Jones
ATTORNEYS :::: {.columns}
::: {.column}
United States Patent Office 2,949,530
Patented Aug. 16, 1960

2,949,530

FLASHLIGHT

Richard E. Hagen, Madison, and Ralph T. Jacobsen, Stoughton, Wis., assignors, by mesne assignments, to The Electric Storage Battery Company, Philadelphia, Pa., a corporation of New Jersey Filed Mar. 22, 1957, Ser. No. 648,466

1 Claim. (Cl. 240—10.61)

This invention relates to a flashlight. More specifically this invention relates to a flashlight comprising a tubular casing having a light and a switch assembly therein, said casing adapted to be fitted over the top of a cylindrical dry cell battery. Still more specifically this invention relates to a flashlight comprising a tubular casing having mounted therein a light and a switch assembly, said casing adapted to be fitted over the top of a cylindrical dry cell or dry cell battery, said light assembly having means for attachment of one of its electrical contacts to an end terminal of such battery and said switch assembly having means for making electrical contact with a peripheral surface terminal of such battery.

In the prior art, devices have been disclosed which are adapted to form a flashlight by attachment of such device to the top of a cylindrical dry cell battery. One such device is shown in the Patent 1,971,266 to Kingsbury. A flashlight attachment for batteries is shown in the prior art comprising a molded plastic head having a light and switch assembly. In this device the plastic head is slipped over the top of the battery so that the central end contact of the light associated therewith is in contact with the center terminal of such battery. Contact with the peripheral terminal of the battery is established by means of a wire adapted to be slipped between the tubular cardboard sheath of the battery and the battery wall itself. Said wire contacts the base contact of the light through switch means.

Such devices of the prior art are subject to many drawbacks. For instance, the switch means is exposed on the outside of the molded head and is hence susceptible to becoming distorted and inoperative should it receive a blow. Also, auxiliary wires adapted to establish contact with the peripheral terminal of the battery cannot be depended on for a sure contact with said terminal in the event the terminal wall is covered with oxide or any other naturally formed non-conductive covering. Neither can the wire be depended upon for penetration of a lithograph coating of an area of the peripheral wall which is common in batteries of today. Another disadvantage is that there are no adequate means for securing the attachment to such battery. For attachment the devices depend solely on the fit of the plastic cylinder over the battery wall. This fit even under most favorable circumstances is not sufficient to hold the two members together under any strain. After a period of use, the attachment, its plastic drying out, loses its resilience and hence the grip on the battery becomes even flimsier. There is no additional means provided for securing the attachment to the battery.

The present invention disposes of the drawbacks inherent in the device and other attachments of this general nature disclosed in the prior art. An object of the present invention is to provide an improved flashlight attachment for a dry cell battery, said attachment having a streamlined configuration and including a switch, all parts except the operator button of which are within the attachment not exposed to damage or liable to "catch" on clothing or the like.

:::
::: {.column}
Another object of this invention is to provide in a flashlight attachment a securing means in addition to the resilient grip of the device about the wall of the battery, said means comprising a snap type of clip rigidly mounted in the device and adapted to engage an end terminal of such cell whereby the flashlight of this invention becomes a rugged unitary structure.

A still further object of this invention is to provide a flashlight with a switch assembly having contacts adapted to engage the cylindrical wall of such battery said contacts including means to penetrate a non-conductive coating on said cylindrical wall.

A further object of this invention is to present a streamlined flashlight attachment for a battery which is simple in construction and inexpensive to make.

This invention embodies other novel features, details of construction and arrangement of parts, which are hereinafter set forth in the specification and claims and illustrated in the accompanying drawings, wherein:

Fig. 1 is a perspective view of the device as attached to a dry cell battery, said view being taken slightly from in front of and above the device;

Fig. 2 is a perspective view of the device as attached to a battery, said view being taken slightly from the rear of and above the device;

Fig. 3 is an enlarged rear plan view of the device attached to a cell showing in dotted lines the battery wall contact;

Fig. 4 is an exploded perspective view showing slightly from above and from the rear the various parts of the casing, light assembly, and switch assembly;

Fig. 5 is an enlarged sectional view taken on the line 5—5 of Fig. 3 and showing in dotted lines a battery associated with said device;

Fig. 6 is an enlarged sectional view taken on the line 6—6 of Fig. 5;

Fig. 7 is an enlarged rear plan fragmentary view of the securing and contact means as taken on line 7—7 of Fig. 5;

Fig. 8 is an enlarged sectional view taken on the line 8—8 of Fig. 7 and showing in cross section the engagement of a clip contact means with the end terminal of a cylindrical battery;

Fig. 9 is an enlarged fragmentary sectional view taken on line 9—9 of Fig. 5 showing a portion of the switch assembly.

Referring more specifically to the drawings, the flashlight, according to my invention, comprises the attachment 10 and the dry cell battery 12 as shown in Fig. 1. The attachment 10 is a head and includes a tubular sleeve or case 13 preferably of plastic and slightly flared at one end to present an enlarged mouth 13a to receive the light assembly generally designated 14. Tubular case 13 is longitudinally slotted as at 15 and 15' (see Fig. 4) to permit ears or arms 16 and 16' to extend into the interior of said case to operate parts of the switch assembly in response to the associated switch button 18 which rides on the outside of case 13. To create an attractive appearance and to facilitate operation, switch button 18 may be formed with a sloping surface having a number of serrations. It can be seen from Figs. 1 and 2 that the dry cell battery 12 itself forms part of the flashlight and provides a grip for the hand of the operator for carrying the flashlight and so that he may, while so gripping it, conveniently manipulate switch button 18 with his thumb.

Fig. 4 discloses by means of an exploded view the interrelation of the various parts of the device. Lighting assembly 14 comprises the lens 20 which may be made of glass or plastic, the reflector 22 which preferably has an outwardly extending peripheral flange 24 about the wider end thereof and the lens ring 26. Lens ring 26 comprises a split ring of resilient steel or the like adapted
:::
::::

to be seated in an annular groove 28 which extends within mouth 13a of attachment 10 and forms a shoulder 28a at the inside wall of groove 28. Near mouth 13a of case 13 the groove 28 is especially rounded and deepened as at 28b. By this means the connection of the lighting assembly to case 13 is a simple process comprising merely the steps of first inserting the lamp bulb in its socket then inserting the reflector and attached parts into case 13 so that flange 24 abuts shoulder 28a. Next the lens 20 is placed against flange 24. Lastly, ring 26 is contracted, placed against the lens and allowed to return to its normal shape, fitting into the deepened rounded area 28b. The inner diameter of ring 26 is less than the outer diameter of lens 20 and, consequently, ring 26 retains the lens firmly in position in tubular case 13.

Further reference to Fig. 5 shows that reflector 22 which may be metallic or plastic with an outer electrically conductive covering is formed with a central reduced neck 29 having a slightly larger circular extension 30 attached thereto. An annular shoulder 32 is formed on the inside at the juncture of the two parts 29 and 30. Circular extension 30 is threaded interiorly as at 34 to receive a cup-shaped plug 36 having a well 38. The plug 36 is exteriorly threaded at 40. By this simple arrangement a conventional light 42 having a conductive cylindrical base 44 forming a first contact with an outwardly extending metallic flange 46 as one terminal at the edge thereof and a central end contact 48 forming a second terminal can be installed in the device. The light bulb is inserted into the neck of the reflector until flange 46 abuts shoulder 32. Well 38 of the cup-shaped plug 36 is then placed over base 44 and plug 36 is screwed into the circular extension 34 until the bulb is tightly secured. To afford a grip in turning it, cup-shaped plug 36 has longitudinally extending ribs 49 on the outside thereof.

A small opening 50 is formed in the bottom wall of plug 36. Abutting the outside of said wall is the bight 51 of a cup-shaped spring contact clip or clutch 52 having legs 53—53' with inwardly curved feet 54—54'. The legs each have a flat portion 53a—53a' intermediate the bight and the foot. Said flat portion is substantially parallel to the bight. An opening 56 in the bight is aligned with opening 50 of the bottom wall of plug 36 and the two are connected together by a metallic grommet 58. In order to keep the clip 52 from turning with respect to the plug, the outside of said bottom wall may have a diametrically disposed recess 59 into which said bight may fit.

As is shown in Fig. 7, the inwardly curved feet 54—54' of legs 53—53' are of arcuate shape, curved about the axis of clip 52, to cooperate better with a cylindrical member. More specifically, feet 54—54' are designed to cooperate with a metallic central top terminal 60 of a battery shaped as shown in Fig. 8. Battery terminal 60 is rigid and has an enlarged head 62 with a reduced neck 64 which feet 54—54' of legs 53—53' resiliently and releasably engage. The end terminal 60 and the clip 52 thus comprise two halves of a separable fastener which may be likened to a snap-button fastener. Since terminal 60 of the battery, U-shaped contact clip 52 and grommet 58 are all metallic, electricity is communicated from the battery to the central end contact of light 42.

In forming the flashlight unit by attaching the device to a battery, the open end of casing 13 is forced over the terminal end of the battery so that there is a tight resilient engagement between the two parts. To form an even more rugged unitary structure, the two parts are telescoped until central terminal 60 of the battery engages feet 53—53' of clip 52 to force them apart and finally to allow them to assume a more closed disposition engaging the reduced neck 64. Thus the resilient wall of casing 13 in gripping the cell wall and resilient cup-shaped clip 52 in gripping the end terminal cooperate to create a strong coupling cup. In addition, an effective electrical connection between the top terminal 60 of the battery and the central end contact 48 of the bulb is established. This connection is further supplemented by the abutment of terminal head 62 with flat portions 53a—53a'.

While it is preferred to manufacture cells having a central terminal cap with an enlarged head and a reduced neck especially for use with the attachment as explained above, it is also within the scope of this invention to provide stamped adapter caps to fit over and snugly engage the top cap terminal of conventional cells. It should be understood that such adapter caps should be exteriorly shouldered and otherwise formed to provide the cell terminal features illustrated in Fig. 5 and be provided with an interior cup-shaped recess to fit snugly over a conventional top terminal.

As noted above, in the preferred form of the invention the tubular case 13 is formed with slots 15—15' side by side and disposed longitudinally of the case, said slots extending through said case. In these slots arms 16—16' depending from either side of switch button 18 travel. Within case 13 a recess 72 is formed between slots 15—15a and extends substantially the length of case 13. Also a circumferential recess 74 is made in the inner periphery of the case adjacent said slots. Into the circumferential recess 74 is fitted a resilient arcuate dry cell or dry cell battery wall contact strip 76 having a struckup detent 78 in the center thereof adapted to fit a similar indentation in the bottom wall of the recess 74. The four corners of cell wall contact strip 76 are turned down as shown in Fig. 5 to provide sharp cutting points 80 to scrape the side wall of the cell and establish good electrical contact therewith by removing any insulating paint or coating at that point. Cell wall contact strip 76 is resilient as can be inferred from Fig. 6. It normally assumes the position shown in solid lines but the ends bend up upon insertion of the cell to accommodate it. When the cell or battery is installed in tubular casing 13 points 80 dig into the side wall thereof to contact the bare metal, penetrating any lithograph coating, dirt or oxide which may be on the side wall of the battery. The cell or battery with which strip 76 is designed for use is of the type having a cylindrical metallic container which forms one terminal thereof. Other types of cell can be simply modified for use with this attachment. For instance, the cell as disclosed in the Patent 2,243,938 and having a tubular metallic jacket thereabout, said jacket being isolated electrically from the terminals of the battery, can be simply modified for use with the attachment of the present invention by shorting the jacket and the metallic base terminal.

It should be understood that while a single dry cell having an initial dry cell voltage of approximately 1½ volts can be employed in the case disclosed in this application, selection of the lamp bulb for use at such voltage would be necessary. It is preferred to use multicell batteries containing two or more dry cells as disclosed in the copending application Serial Number 406,742, filed January 28, 1954, by Anthony et al. With the multicell battery conventional lamp bulbs may be utilized.

Slidably disposed in the longitudinal recess is the reciprocable contact strip 82. For sliding engagement with reflector 22, strip 82 terminates in a curved portion 84 at its end adjacent reflector 22. Adjacent the mid-point of strip 82 are symmetrical notches 86—86' (see Fig. 4) adapted to be engaged by arms 16—16' from the switch button 18 which extend through casing 13. Arms 16—16' are bent inward on the underside of the strip to retain the parts together. Fig. 4 shows in solid lines arm 16 before being bent in and in dotted lines arm 16 as it would appear after being bent in. With this means of connection as switch button 18 on the outside of the case is reciprocated longitudinally of the case switch strip 82 within the case likewise reciprocates.

On the opposite end of strip 82 from curved portion 84 is detent 88 to engage detent 78 on the arcuate cell wall contact strip 76 when rounded end 84 of switch strip abuts the metallic reflector. This engagement causes a catch-type lock holding the switch in the "on" position. Similarly, when switch strip 82 is backed off reflector 22 in turning the flashlight "off" detent 88' snaps into detent 78 making a catch-type lock in the "off" position.

While this invention has been shown in but one preferred form, it is obvious to those skilled in the art that it is not so limited but is susceptible of various changes and modifications without departing from the spirit and scope of the claimed invention.

I claim:

The combination of a cylindrical primary dry cell battery and a flashlight attachment therefor, said battery having a sidewall terminal and a top terminal, said top terminal comprising a rigid head and a reduced neck intermediate said head and said battery, said flashlight attachment comprising a resilient tubular case having a light assembly mounted in one end thereof, the other end being open, said light assembly including a light having a first electric contact and a second electric contact, battery-sidewall-contact means mounted in said tubular case adjacent the open end thereof, said battery-sidewall-contact means comprising a curved resilient metal strip held at its center against the inside wall of the case and having a curvature generally conforming to the inside wall of the case, the opposite ends of the strip having at least one inwardly struck point which contacts the sidewall terminal of the battery and is adapted to pierce layers of paint or oxide to make electrical contact with said terminal, the first electric contact of said light being connected electrically to said battery-sidewall-contact means, the second electric contact being electrically connected to a resilient clutch having a reduced mouth and mounted in the center of said case and directed with its mouth towards the open end of said case, the open end of said case receiving the top of said battery in tight, resilient engagement with the side wall thereof, the resilient clutch engaging the reduced neck of said top terminal in snap installation over the head thereof, and the battery-sidewall-contact means engaging the sidewall terminal of said battery, whereby a circuit between the battery and said light is established and whereby said resilient case by engagement with the sidewall and the resilient clutch by engagement with the center terminal of the battery cooperate to hold said battery and said flashlight attachment together as a unitary structure.

References Cited in the file of this patent

UNITED STATES PATENTS

| | | |
|---|---|---|
| 1,477,875 | Kaplan | Dec. 18, 1923 |
| 1,955,511 | Muros | Apr. 17, 1934 |
| 2,027,912 | Kingsbury | Jan. 14, 1936 |
| 2,236,338 | Emanuel | Mar. 25, 1941 |
| 2,513,071 | Wendt | June 27, 1950 |
| 2,689,907 | Wilson | Sept. 21, 1954 |

FOREIGN PATENTS

| | | |
|---|---|---|
| 556,263 | Great Britain | Sept. 27, 1943 |
| 558,199 | Great Britain | Dec. 24, 1943 |